June 25, 1957 J. WEBER, JR 2,797,293
MANUALLY ACTUATED FOUNTAIN SOLDERING IRON
Filed Feb. 16, 1956
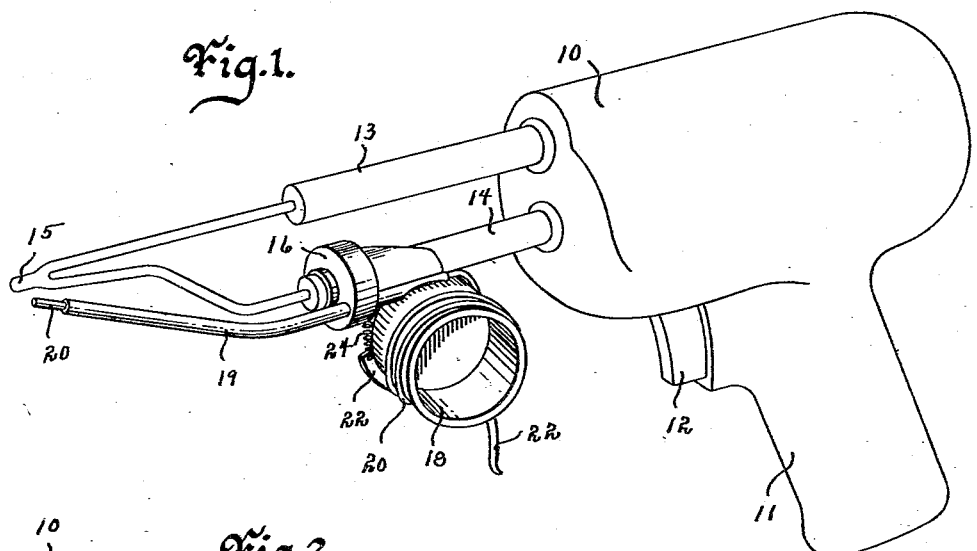
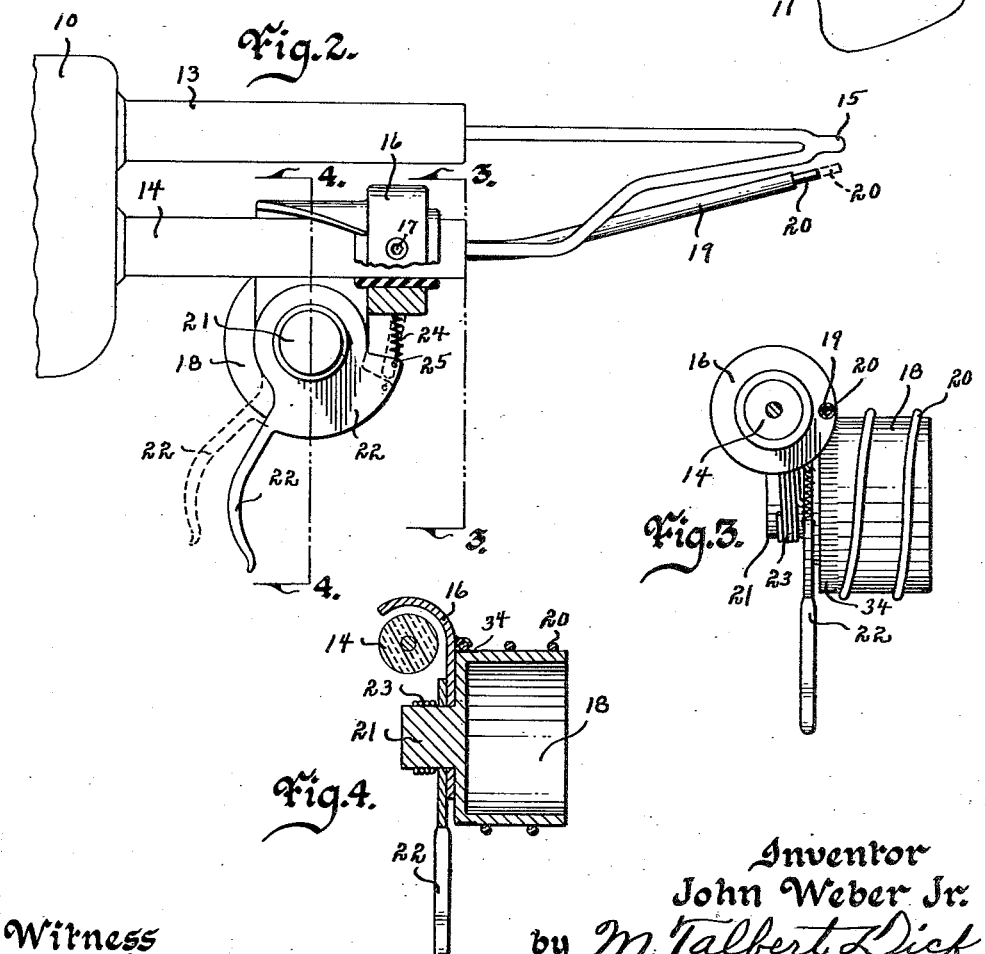
Inventor
John Weber Jr.
by M. Talbert Dick
Attorney
Witness
Edward P. Seeley

United States Patent Office 2,797,293
Patented June 25, 1957

2,797,293
MANUALLY ACTUATED FOUNTAIN SOLDERING IRON

John Weber, Jr., Ames, Iowa

Application February 16, 1956, Serial No. 565,958

2 Claims. (Cl. 219—27)

This invention relates to soldering irons and more particularly to one that carries its own supply of solder.

The use of soldering irons is very old. The first ones had a handle portion and a soft metal head that was preheated just prior to use. The hot head was held against a bar of solder thereby melting a portion thereof and permitting it to run down onto the object to be soldered. The chief objection was that the soldering iron head rapidly cooled and the soldering process had to be postponed until the iron was again reheated. Later this problem was solved by the introduction of the electrically heated soldering iron. Also the solder bar was replaced with the spool wound solder wire, most of which has an acid core. However, the solder wire still had to be applied to the iron head by one hand and the iron held in the other hand. Obviously, the procedure is slow and the result was usually uneven and rough.

Therefore, one of the principal objects of my invention is to provide a unit soldering means that possesses both the heated soldering head and a supply of solder instantly available when needed.

More specifically the object of this invention is to provide a soldering iron that has a supply of solder adapted to be mechanically fed to the soldering iron head by the hand that also holds the soldering iron.

A further object of this invention is to provide a soldering means that uses a less amount of solder than would ordinarily be required for a given soldering task.

A further object of my invention is to provide a combination soldering iron and solder unit that permits rapid and easy replacement of the solder after a supply has been used up.

Still further objects of this invention are to provide a fountain soldering iron unit that is economical in manufacture, durable in use, and refined in appearance.

These and other objects will be apparent to those skilled in the art.

My invention consists in the construction, arrangements and combination, of the various parts of the device, whereby the objects contemplated are attained as hereinafter more fully set forth, specifically pointed out in my claims, and illustrated in the accompanying drawings, in which:

Fig. 1 is a perspective view of my soldering iron ready for use,

Fig. 2 is an enlarged side view of the forward end portion of the device with sections cut away to more fully illustrate its construction, Fig. 3 is an enlarged cross sectional view of the soldering iron taken on line 3—3 of Fig. 2, and Fig. 4 is an enlarged cross sectional view of the device taken on line 4—4 of Fig. 2.

My invention may be used in conjunction with almost any type of soldering iron. In the drawings I show an ordinary standard electric soldering iron having a body portion 10, handle 11, switch trigger 12, and the two element posts 13 and 14 terminating in the solder iron point or head 15. It may be to such an iron that my device is installed and which I will now describe in detail. The numeral 16 designates a bracket member slidably mounted on either of the iron members 13 or 14. The bracket is adjustably fixed by any suitable means such as by the set screw 17. The numeral 18 designates a spool rotatably mounted on the bracket as shown in Fig. 4. The numeral 19 designates a tube secured to the bracket and extending to a point in close proximity to the head point 15 of the soldering iron, as shown in Fig. 1. Wire solder 20 is wound onto the spool reel 18 and its free end portion threaded through the tube 19. Any suitable means may be employed to rotate the spool 18. Obviously, when the spool is rotated in one direction it will unwind the bendable wire solder and force it through the tube 19 to the solder iron point head 15, as shown by the broken lines in Fig. 2.

I find that a manually operated clutch or ratchet means is ideal for rotating the spool when more solder is needed at point of use. In the drawings I use the numeral 21 to designate a hub portion. A trigger 22 is rotatably mounted around the hub having an ordinary one way wrapped clutch coil spring 23 around the hub as shown in Fig. 3. When the trigger lever 22 is manually pulled toward the handle 11, the coil spring 23 will tighten and grip the hub 21 thereby rotating the hub and rotating the spool 18 which in turn will force a given length of the wire solder through the tube 19 and to the solder iron point 15. A small coil spring 24 having an end secured to the trigger and its other end secured to the bracket 16 returns the trigger for the next bite after pressure has been released from the trigger. The movement of the trigger may be limited by a length of straight wire 25 secured at each end with the end of the spring as shown in Fig. 2. Thus, whenever a new supply of solder is needed it is merely necessary to work the trigger lever accordingly and the needed solder will be fed through the tube. While wire solder is bendable it has substantially no resiliency and it may be therefore easily wound around the spool 18. If desired the spool may be roughened or serrated (designated by the numeral 34) to prevent slippage.

Some changes may be made in the construction and arrangement of my manually actuated fountain soldering iron without departing from the real spirit and purpose of my invention, and it is my intention to cover by my claims, any modified forms of structure or use of mechanical equivalents which may be reasonably included within their scope.

I claim:

1. In a soldering means, a base member having a hand grip portion, a soldering iron head operatively secured to said base member, a tube operatively secured to said base member having its forward end extending toward said soldering iron head, a spool rotatably mounted on said base member, a solder wire having a portion of its length wound on said spool and its free end portion extending through said tube, a hub portion on said spool, a trigger rotatably mounted on said hub portion, and a one way wrapped clutch coil spring around said hub portion and secured to said trigger.

2. In a soldering means, a base member having a hand grip portion, a soldering iron head operatively secured to said base member, a tube operatively secured to said base member having its forward end extending toward said soldering iron head, a spool rotatably mounted on said base member, a solder wire having a portion of its length wound on said spool and its free end portion extending through said tube, a hub portion on said spool, a trigger rotatably mounted on said hub portion, a spring for yieldingly holding said trigger in one direction of its rotation, and a one way wrapped clutch coil spring around said hub portion and secured to said trigger.

References Cited in the file of this patent

UNITED STATES PATENTS

| | | |
|---|---|---|
| 490,256 | Meitzler | Jan. 17, 1893 |
| 2,228,291 | Weston | Jan. 14, 1941 |
| 2,570,762 | Caliri | Oct. 9, 1951 |
| 2,643,321 | Greene | June 23, 1953 |

FOREIGN PATENTS

| | | |
|---|---|---|
| 130,273 | Australia | July 10, 1947 |
| 507,997 | Great Britain | June 22, 1939 |